United States Patent
Ajitomi et al.

(10) Patent No.: US 10,511,671 B2
(45) Date of Patent: Dec. 17, 2019

(54) COMMUNICATION DEVICE, COMMUNICATION METHOD, CONTROLLED DEVICE, AND NON-TRANSITORY COMPUTER READABLE MEDIUM

(71) Applicant: KABUSHIKI KAISHA TOSHIBA, Minato-ku (JP)

(72) Inventors: Daisuke Ajitomi, Setagaya (JP); Keisuke Minami, Kawasaki (JP); Koji Tazoe, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 168 days.

(21) Appl. No.: 15/693,051

(22) Filed: Aug. 31, 2017

(65) Prior Publication Data

US 2018/0084059 A1 Mar. 22, 2018

Related U.S. Application Data

(63) Continuation-in-part of application No. 15/462,269, filed on Mar. 17, 2017.

(30) Foreign Application Priority Data

Sep. 16, 2016 (JP) ................................ 2016-181996
Mar. 17, 2017 (JP) ................................ 2017-053661

(51) Int. Cl.
*G06F 15/173* (2006.01)
*H04L 29/08* (2006.01)
(Continued)

(52) U.S. Cl.
CPC ......... *H04L 67/141* (2013.01); *H04W 12/003* (2019.01); *H04W 12/0023* (2019.01); (Continued)

(58) Field of Classification Search
CPC ..... H04L 67/141; H04L 67/02; H04L 63/083; H04W 4/80; H04W 12/06; H04W 12/04; H04W 12/08; H04W 84/12
(Continued)

(56) References Cited

U.S. PATENT DOCUMENTS 6,314,099 B1 * 11/2001 Fujisawa ................. H04L 29/06
370/392
8,510,255 B2 8/2013 Fadell et al.
(Continued)

FOREIGN PATENT DOCUMENTS

JP 2001-268107 A 9/2001
JP 2015-009599 1/2015
(Continued)

*Primary Examiner* — Sm A Rahman
(74) *Attorney, Agent, or Firm* — Oblon, McClelland, Maier & Neustadt, L.L.P.

(57) ABSTRACT

According to one embodiment, a communication device includes: processing circuitry configured to: generate a first code in response to a first code generation request being received, the first code generation request including address information of a service which is provided by a device to a control device, and transmit the first code to the device; manage such that the first code is held in association with the address information; and receive an address acquisition request including the first code from the control device, and transmit the address information associated with the first code to the control device on condition that the first code included in the address acquisition request is held in association with the address information.

9 Claims, 13 Drawing Sheets

(51) Int. Cl.
*H04W 12/06* (2009.01)
*H04W 12/00* (2009.01)
H04L 29/06 (2006.01)
H04W 84/12 (2009.01)

(52) U.S. Cl.
CPC .......... *H04W 12/06* (2013.01); *H04L 63/083* (2013.01); *H04L 67/02* (2013.01); *H04W 84/12* (2013.01)

(58) Field of Classification Search
USPC ....................................................... 709/225
See application file for complete search history.

(56) References Cited

U.S. PATENT DOCUMENTS

| | | | |
|---|---|---|---|
| 2002/0191572 A1* | 12/2002 | Weinstein | H04L 63/08 370/338 |
| 2013/0247117 A1* | 9/2013 | Yamada | G08C 17/02 725/93 |
| 2014/0048439 A1* | 2/2014 | Vulgamott | B65D 5/54 206/459.5 |
| 2016/0087907 A1 | 3/2016 | Ajitomi et al. | |

FOREIGN PATENT DOCUMENTS

| | | |
|---|---|---|
| JP | 2015-159599 | 9/2015 |
| JP | 2016-63425 | 4/2016 |

\* cited by examiner

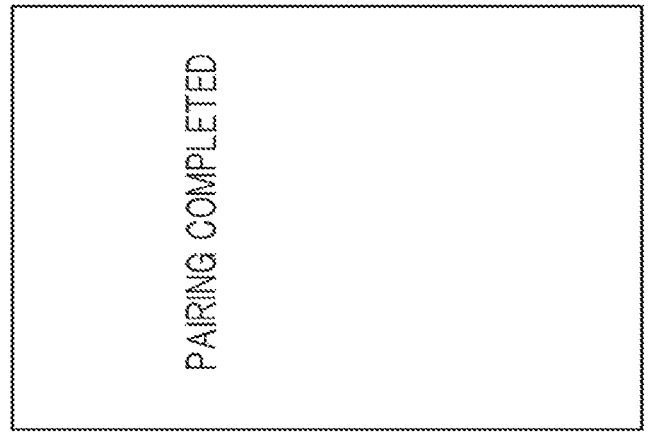
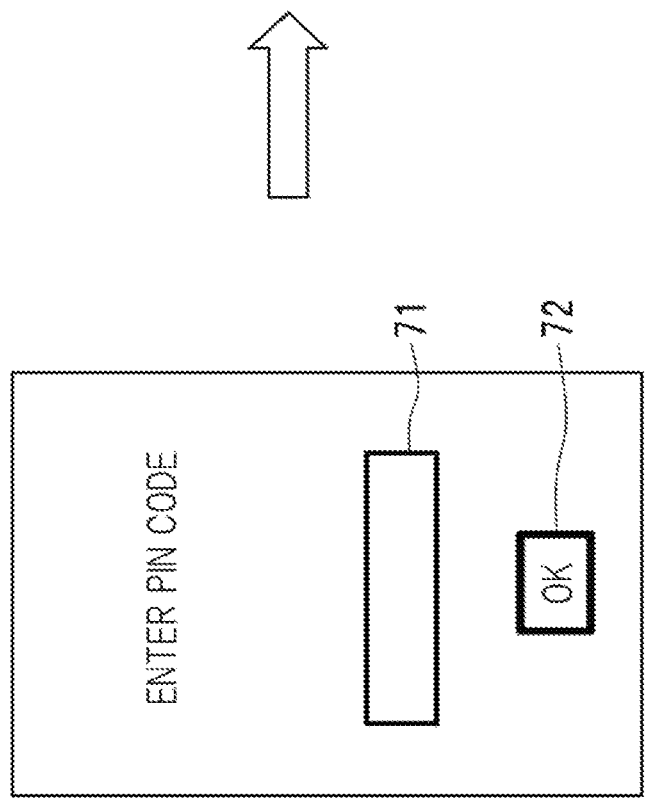
FIG. 4

COMMUNICATION DEVICE, COMMUNICATION METHOD, CONTROLLED DEVICE, AND NON-TRANSITORY COMPUTER READABLE MEDIUM

CROSS-REFERENCE TO RELATED APPLICATIONS

This application is a continuation-in-part application of Ser. No. 15/462,269 filed on Mar. 17, 2017 and also based upon and claims the benefit of priority from Japanese Patent Applications No. 2016-181996 filed on Sep. 16, 2016 and No. 2017-053661 filed on Mar. 17, 2017; the entire contents of these applications are incorporated herein by reference.

FIELD

Embodiments of the present invention relate to a communication device, a communication method, a controlled device, and a computer program.

BACKGROUND

Existing technologies allow a device (home appliances, digital appliances, etc.) in a local network such as a home local area network (LAN) to be controlled by a control device such as a user terminal (PC, smartphone, etc.). According to generally known methods, an application for controlling the device, which is installed on the user terminal, discovers the device in the local network to be connected to the discovered terminal. In this context, according to existing methods, UDP-protocol-based device discovery protocols such as mDNS, UPnP, and ECHONET™ may be used to discover the device by the application of the user terminal and establish the connection channel for interaction. Also, according to other methods, a communication medium such as Bluetooth™ and Wi-Fi may be used to support the device discovery in a communication layer lower than the above-mentioned layer. In the case of Wi-Fi, the device includes a Wi-Fi access point (hereinafter referred to as "AP") function, an SSID of this Wi-Fi AP is selected by the user terminal, and thus the user terminal is allowed to be connected to the device.

The method that uses the UDP-based device discovery protocol cannot be used for a Web page that operates on the Web browser (hereinafter referred to as "Web front-end"). This is because the device discovery protocol cannot be used via the Web front-end. A dedicated application needs to be compliant with various types of smartphones and OS versions, which requires development costs.

Meanwhile, the method that uses Wi-Fi can be used via the Web front-end. According to this method, although no dedicated application needs to be provided, the device needs to incorporate the AP mode. In general, incorporation of the AP mode requires more cost than in the case where it does not need to be incorporated. Also, with regard to Bluetooth, it is possible that Bluetooth becomes available in the future via the Web front-end but it cannot be currently used. Even when it becomes available in the future, the device needs to incorporate the Bluetooth feature. In the case of a device that has the Internet connection function, the device needs to include a Wi-Fi or wired LAN interface, in addition to which incorporation of the Bluetooth feature leads to increase in the costs as in the case of incorporation of the AP mode.

Some methods have been proposed such as a method that has the advantages of the above-described two methods, i.e. a method that does not need to incorporate in the device the module such as the Wi-Fi AP mode and the Bluetooth feature, which causes increase in the costs, and carries out pairing via the Web front-end between the user terminal and the device in the local network. Pairing as used herein refers to allowing the device on the local network to be controlled by the user terminal by specifying the user terminal and the device as a pair of devices between which communications are allowed.

As the method of pairing, for example, a method has been disclosed according to which passcode-based pairing of the user and the device is carried out on a cloud. However, pairing that solely relies on a passcode is susceptible to brute-force attacks. Specifically, if a passcode of four-digit numerical data is to be entered, then only one hundred thousand passcodes from 0000 to 9999 are available, so that it is possible to cause the pairing between the user and the device to fail by making an access by randomly selecting the numerical values. Although the resistance (to brute-force attacks) can be increased by making the passcode sufficiently long, such a sufficiently long pass code is not without a problem. The device will have to include a device capable of displaying the long passcode. Also, the user needs to take labor and time or may make erroneous inputs, which causes degradation in the usability associated with the long passcode.

BRIEF DESCRIPTION OF THE DRAWINGS

FIG. 4 is a diagram illustrating examples of a PIN code entry screen and a mapping completion message;

DETAILED DESCRIPTION

According to one embodiment, a communication device includes: processing circuitry configured to: generate a first code in response to a first code generation request being received, the first code generation request including address information of a service which is provided by a device to a control device, and transmit the first code to the device; manage such that the first code is held in association with the address information; and receive an address acquisition request including the first code from the control device, and transmit the address information associated with the first code to the control device on condition that the first code included in the address acquisition request is held in association with the address information.

The embodiments of the present invention will be described below with reference to the drawings.

Figure 1:
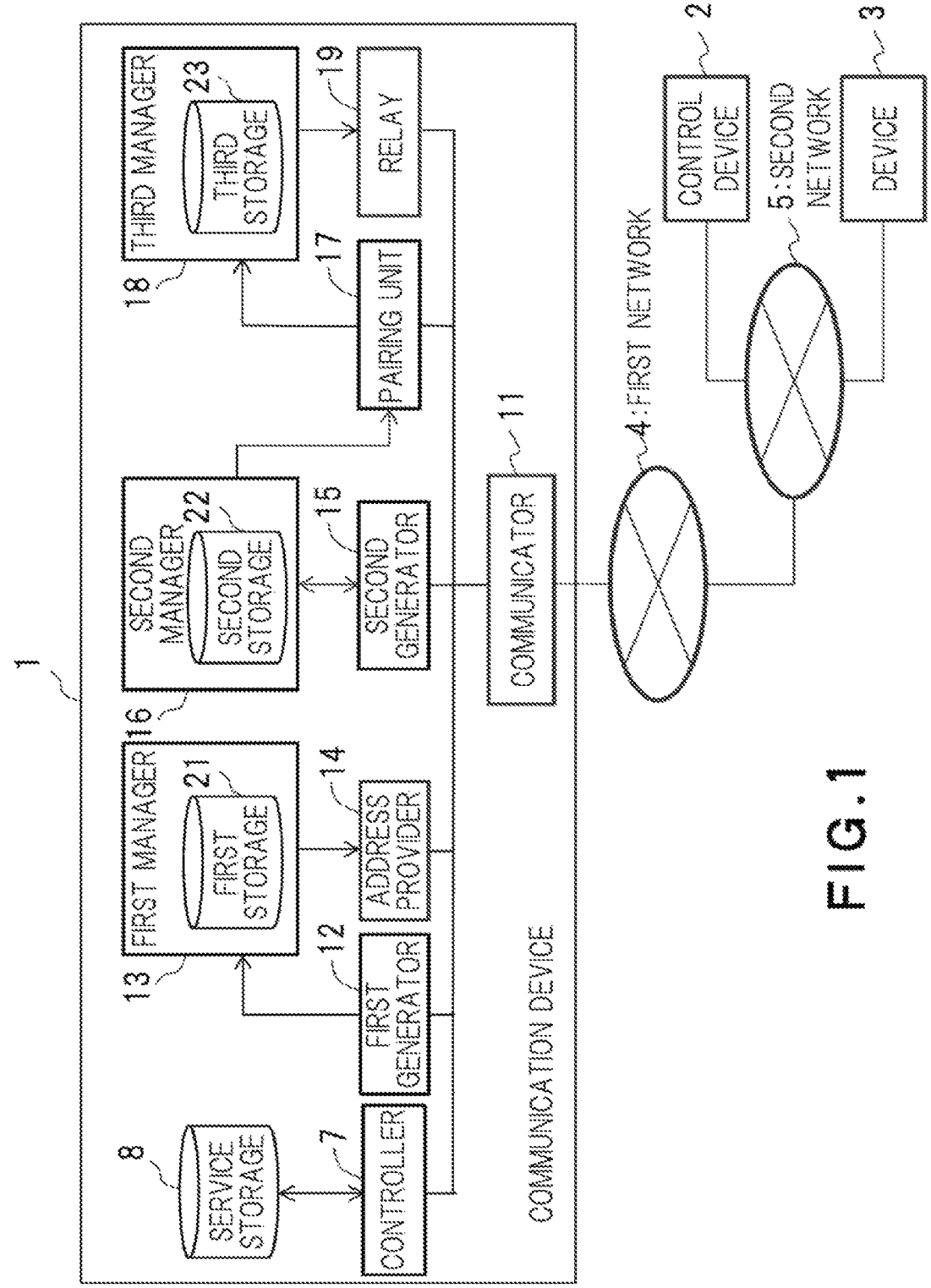
FIG. 1 is a diagram illustrating a communication system that includes a communication device in accordance with one embodiment of the present invention.

FIG. 1 illustrates a communication system that includes a communication device 1 in accordance with one embodiment of the present invention.

The communication system illustrated herein includes a communication device 1, a control device 2, and a device (a controlled device) 3. The communication device 1 is connected to a first network 4. The control device 2 and the device 3 are connected to a second network 5. The second network 5 is connected to the first network 4. The communication device 1 is capable of performing communications with the control device 2 and the device 3 via the first network 4 and the second network 5. The control device 2 is capable of performing communications with the device 3 via the second network 5.

The first network 4 is a wide area network (WAN) such as the Internet. Meanwhile, the first network 4 is not limited to the Internet and it may be a private network such as an intranet and a home network.

The second network 5 is a local area network (LAN) installed in a house, office, factory, and the like. The specific medium of the LAN network considered herein is a medium such as Ethernet™ and wireless LAN that allows IP communications to be performed in its upper layer. However, any specific medium may be used as appropriate as long as it can implement the same or equivalent functionality. Also, the upper communication protocol is not limited to IP. In this embodiment, the second network 5 is regarded as a home network configured by a wireless LAN.

Although this embodiment involves a network having a two-stage configuration including the first network 4 and the second network 5, the network may be configured solely by the local network. In that case, the first network 4 will not be provided while the communication device 1 will be connected to the second network 5.

The communication device 1 is a server device. The communication device 1 may be provided as a physical machine or a virtual machine. The communication device 1 provides a device registration service and a remote control service. The device registration service allows for registration of the device 3 as the target of the remote control service. The remote control service allows for remote control of the device 3 from the control device 2. As an example of the remote control considered herein, a user who is out of his/her house operates the control device 2 to control the device 3 arranged in his/her house. The remote control service is by way of example implemented as a Web service. The device registration service may also be implemented as a Web service.

The control device 2 is a terminal device (user terminal) operated by the user. As the control device 2, a personal computer (PC), a smartphone, a tablet terminal may be considered. According to this embodiment, the control device 2 is regarded as a smartphone. The control device 2 incorporates a Web browser to access Web services.

The device 3 is a device that is the target of control by the control device 2 (controlled device). The device 3 may encompass a wide variety of appliances having communication functionality including networked home appliances, digital appliances such as television, housing equipment, building equipment, factory equipment, and the like. In this embodiment, the device 3 is regarded as an air conditioner. The device 3 provides a predetermined service (a service that accepts a pairing code acquisition request, which will be described alter) for the control device 2. The control device 2 can use this service by accessing a predetermined address of the device 3 (URL, etc.).

The functional blocks of the communication device 1 is described below. The communication device 1 includes a communicator 11, a first generator 12, a first manager 13, an address provider 14, a second generator 15, a second manager 16, a pairing unit 17, a third manager 18, a relay 19, a first storage 21, a second storage 22, a third storage 23, a controller 7, and a service storage 8.

The communicator 11 is connected to the first network 4 by wired or wireless connection and configured to perform communications with the control device 2 and the device 3 via the first network 4. As described above, a configuration in which the communication device 1 is arranged in the second network 5 is also possible. In that case, the communicator 11 will be connected to the second network 5 by wired or wireless connection.

The controller 7 is configured to control the entire communication device 1. The controller 7 also carries out processing associated with providing the device registration service. The service storage 8 stores basic information for carrying out the device registration service and the remote control service. For example, the service storage 8 stores information regarding the device which is the target of the device registration service. Also, the service storage 8 stores information regarding the user registered in the remote control service. For example, when the controller 7 receives a device registration request that includes first credential information (a product ID and a secret key) from the device 3 that is yet to be registered as the target device, then the controller 7 issues second credential information to the device 3 and transmits the second credential information to the device 3. The second credential information includes device identification information and a secret key (which may be different from the secret key of the first credential information). As an example of the information regarding the user, user ID, password, and other various pieces of information regarding the attributes of the user may be considered.

The first generator 12 is configured to receive a PIN code generation request (first code acquisition request) from the device 3 already registered by the device registration service via the communicator 11. When the first generator 12 receives the PIN code generation request, the first generator 12 generates a PIN code and transmits the generated PIN code to the device 3 as a response to the request. The PIN code considered here is a short code that a user can readily enter, for example, a four-digit figure. Any appropriate method may be used to generate the PIN code. As one example, the PIN code may be generated using a random number generator or a random number generation algorithm, or the PIN code may be issued by count up by a predetermined value every time a PIN code generation request is received. The PIN code may be generated using other algorithms.

Here, the PIN code generation request includes address information indicative of an address of the service provided by the device 3. The address information is used for the control device 2 to access the service provided by the device 3. This service acquires a pairing code acquisition request (second code acquisition request) from the control device 2, acquires a pairing code from the communication device 1 in accordance with the request, and provides the acquired pairing code to the control device 2. As a specific example of the address information, for example, URL of Web API, IP address, and mDNS domain name may be mentioned. In the following explanations, this address information is called "device address."

The PIN code generation request may include second credential information necessary for authentication as well as the device address. In that case, the first generator 12 or the controller 7, etc. of the communication device 1 may carry out authentication of the device 3 on the basis of the information.

The first manager 13 is configured to associate a PIN code generated by the first generator 12 with the device address included in the PIN code generation request and then register the PIN code and the device address associated with each other in the first storage 21 (i.e., make the first storage 21 hold the PIN code and the device address). Also, when the first manager 13 has received a search request with the PIN code used as a key from the address provider 14, the first manager 13 searches the corresponding device address from the first storage 21 and returns the device address to the address provider 14.

The first manager 13 considered herein may be implemented by RDBMS or a cache server such as memcached and redis. Meanwhile, the specific mode of implementation of the first manager 13 is not limited to particular ones and, for example, the first manager 13 may be implemented as a data container on a volatile memory device in the server process including the first generator 12. The first storage 21 may be volatile memory such as DRAM and SRAM or non-volatile memory such as NAND flash memory, FRAM, and MRAM. Alternatively, the first storage 21 may be a device such as a hard disk and an SSD. While the first manager 13 includes the first storage 21, the first storage 21 may be externally attached to the communication device 1 or the first storage 21 may be arranged in an appropriate network. In the latter case, the first manager 13 accesses the first storage 21 via the network. It is considered here that the above-described service storage 8 and the other manager and other storage which will be described later may also have various modes in the same manner as described above.

The address provider 14 is configured to receive a device address acquisition request from the control device 2 via the communicator 11. The device address acquisition request includes a PIN code and identification information regarding the control device 2. When the address provider 14 receives the device address acquisition request, the address provider 14 sends a search request that includes the PIN code as the key to the first manager 13. The address provider 14 acquires, as a response, the corresponding device address from the first manager 13. As a specific example of the identification information regarding the control device, information that identifies the control device 2 itself such as an IP address or MAC address of the control device 2 may be considered. Alternatively, account information such as a login ID of the user who uses the Web service of the communication device 1 by using the control device 2, login session information (a session ID issued by the Web service at the time of login, or the like), and email may also be considered.

The address provider 14 transmits a response message including the device address acquired from the first manager 13 to the control device 2. It should be noted that, as will be described later, the mode of the response transmitted to the control device 2 may be a redirect request to the device address (HTTP 302 response, 303 response, or the like) or may be a normal response without redirection (HTTP 200 response, etc.).

The second generator 15 is configured to receive a pairing code generation request from the device 3. The pairing code generation request includes device identification information of the device 3. The device identification information is the piece of information included in the above-described second credential information. Specifically, the device identification information is an ID unique within the Web service which has been issued to the device 3 by the communication device 1 or the Web service provided by the communication device 1. Meanwhile, the device identification information is not limited to this. For example, it may be identification information assigned to the device 3 itself such as an IP address or MAC address of the device 3.

When the second generator 15 receives the pairing code generation request, the second generator 15 generates the pairing code. It is considered that the pairing code is longer than the PIN code and is a complicated random character string, though such a limitation is not essential. The second generator 15 by way of example generates a pairing code using a random number generator or a random number generation algorithm.

Here, the pairing code generation request may include, as the information necessary for authentication, the secret key included in the second credential information in addition to the device identification information of the device 3. The second generator 15 or the controller 7 of the communication device 1 may carry out authentication of the device 3 on the basis of the device identification information and the secret key.

The second manager 16 is configured to associate the generated pairing code with the device identification information of the device 3 and registers the pairing code and the device identification information in the second storage 22 as the pairing determination information (i.e., make the second storage hold the paring code and the device identification information).

When the second manager 16 receives a search request including the pairing code as the key from the pairing unit 17, the second manager 16 searches the device identification information that corresponds to the search request from the second storage 22 and returns the device identification information to the pairing unit 17.

The pairing unit 17 is configured to receive a pairing request from the control device 2 via the communicator 11. The pairing request includes the pairing code and the identification information regarding the control device 2. When the pairing unit 17 receives the pairing request, the pairing unit 17 provides a search request including the pairing code as the key to the second manager 16 and acquires, from the second manager 16, device identification information that corresponds to the search request.

The third manager 18 is configured to associate the device identification information acquired by the pairing unit 17 with the identification information regarding the control device 2 and register the device identification information and the identification information in the third storage 23 (i.e., make the third storage 23 hold the device identification information and the identification information). The identification information regarding the control device 2 may be identical to the one included in the pairing request or may be other identification information if it is identification information regarding the same control device. For example, the identification information regarding the control device included in the pairing request may be a session ID and the identification information regarding the control device used in pairing may be a user ID. By virtue of this, the device 3 is paired with the user. The device identification information and the identification information regarding the control device 2 associated with each other correspond to the pairing information.

The third manager 18 is configured to receive, from the relay 19, an acquisition request that includes either the device identification information or the identification information of the user as the key. When the third manager 18 receives the acquisition request, the third manager 18 acquires the information of the other party of the pairing from the third storage 23 and respond to the relay 19 with the acquired information.

The relay 19 is configured to relay communications between the control device 2 and the device 3. The communications considered herein may involve various protocols such as HTTP, WebSocket, TURN, and the like. The relay 19 refers to the pairing information stored in the third storage 23 and carries out control associated with the communications to and from them.

Specifically, the relay 19 receives a message from the control device 2. When the destination of the received message is the device 3, the relay 19 checks whether or not the device identification information of the device 3 is subjected to the pairing with the identification information regarding the control device 2 by making an inquiry to the third manager 18. When it is subjected to the pairing, then the relay 19 permits communication (access) to the device 3, and transfers the message received from the control device 2 to the device 3. As an example of the message, a message that includes a command that controls the device 3 (e.g., a command that adjusts the temperature of the air conditioner), a command that acquires the information of the device 3 (e.g., a command that acquires data of a temperature sensor included in the air conditioner) may be mentioned.

Meanwhile, when the device identification information of the device 3 is not subjected to the pairing with the identification information regarding the control device 2, then the relay 19 rejects the communication to the device 3. In this case, the relay 19 by way of example carries out processing associated with (but not limited to) transmitting an error message to the control device 2. In the same manner, when a message addressed to the control device 2 is received from the device 3, the relay 19 checks presence or absence of pairing between the device 3 and the user and thereby determines whether or not the communication of the device 3 should be permitted. When the relay 19 permits the communication, the relay 19 transfers the message. When the relay 19 does not permit the communication, the relay 19 returns an error message and performs other relevant processing.

Figure 2:
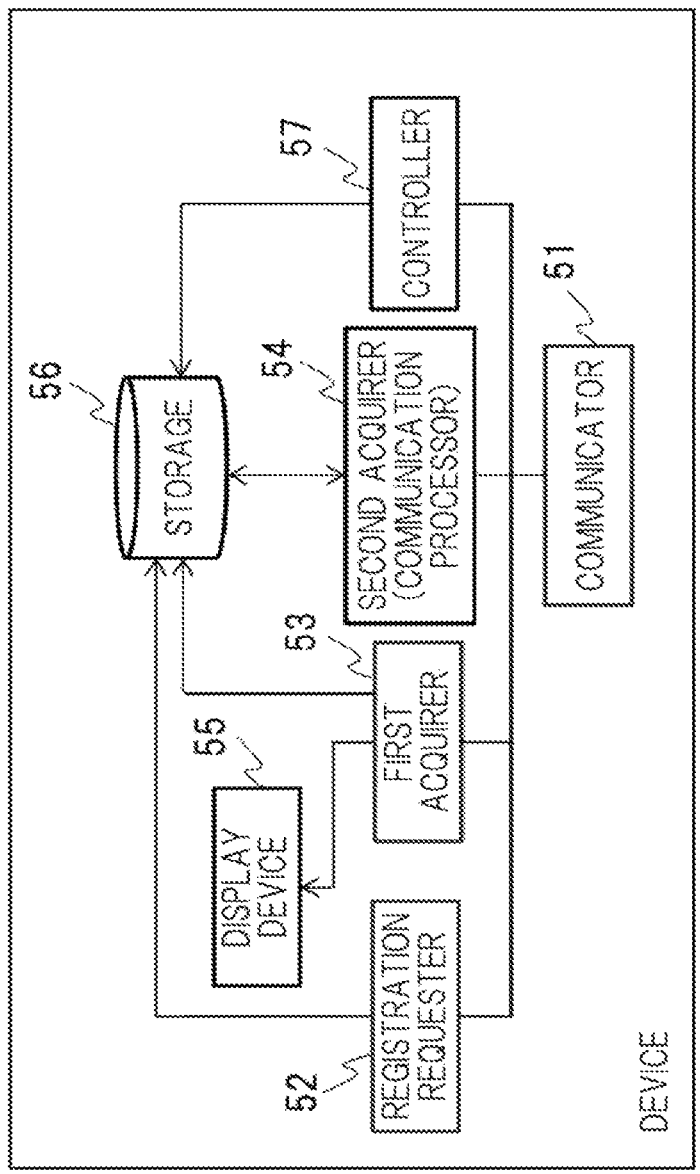
FIG. 2 is a block diagram illustrating an exemplary configuration of a device.

FIG. 2 is a block diagram that illustrates an exemplary configuration of the device 3. The device 3 includes a communicator 51, a registration requester 52, a first acquirer 53, a second acquirer (communication processor) 54, a display device 55, a storage 56, and a controller 57.

The communicator 51 is connected to the second network 5 by wired or wireless connection and configured to perform communications with the control device 2. Also, the communicator 51 is configured to perform communications with the communication device 1 via the second network 5.

The storage 56 is configured to store data generated or acquired by the registration requester 52, the first acquirer 53, the second acquirer 54, or the controller 57. Also, the storage 56 stores the first credential information ("produc-t_id" and "product_secret") of the above-described device 3. The first credential information is issued by the communication device 1 for each product. In addition, the storage 56 stores data or programs necessary for the individual units to operate inside of the device 3.

The controller 57 is configured to control the operation of the entire device 3. For example, if the device 3 is an air conditioner, the controller 57 may carry out control associated with air conditioning. Also, if the device 3 includes a sensor, the controller 57 may store data acquired from the sensor in the storage 56. Also, when the device 3 after having been subjected to pairing with the user of the control device 2 has received a message of the control device 2 that was relayed from the communication device 1, then the controller 57 may carry out operation in accordance with the instruction of the message and create and transmit a response message.

The registration requester 52 is configured to transmit the device registration request to the communication device 1, for example, in accordance with the instruction of the user or the like. The device registration request is a request that requests registration of the device 3 to the service of the communication device 1. The device registration request includes, as one example, the first credential information ("product_id" and "product_secret"). The registration requester 52 receives a response including the second credential information from the communication device 1 as a response to the device registration request. The second credential information includes the device identification information and the secret key. Thereafter, in the communications from the device 3 to the communication device 1, authentication and access control may be carried out based on the device identification information and the secret key.

The first acquirer 53 is configured to transmit the PIN code issue request (first code acquisition request) to the communication device 1 at a predetermined timing (e.g., the timing specified by the user, the timing of completion of the device registration, etc.). The PIN code issue request includes, as the argument, address information (device address) for making an access from the Web front-end to the service of the device 3. In addition, as described above, for authentication, the second credential information may be included.

The device address can be expressed in the format of, for example, "https://192.168.11.10/pairing_code". The service of the device 3 accepts the pairing code acquisition request from the control device 2. "192.168.11.10" may be an mDNS domain such as "_aircon1._http._tcp.loca"l. Also, the address information may be an IP address in place of a URL.

The first acquirer 53 receives a response that includes the PIN code from the communication device 1 and displays the PIN code included in the response on the display device 55. The user who views the PIN code displayed on the display device 55 is allowed to recognize the PIN code generated by the communication device 1.

The second acquirer 54 provides a service associated with accepting the pairing code acquisition request (second code acquisition request) with the device address. When the second acquirer 54 receives, by the service, the pairing code acquisition request from the control device 2, the second acquirer 54 generates the pairing code generation request and transmits the pairing code generation request to the communication device 1. The pairing code generation request includes the device identification information of the device 3 and may further include the secret key of the second credential information. The second acquirer 54 receives a response that includes the pairing code from the communication device 1. The second acquirer 54 transmits, as a response to the pairing code acquisition request, the pairing code received from the communication device 1 to the control device 2.

Figure 3:
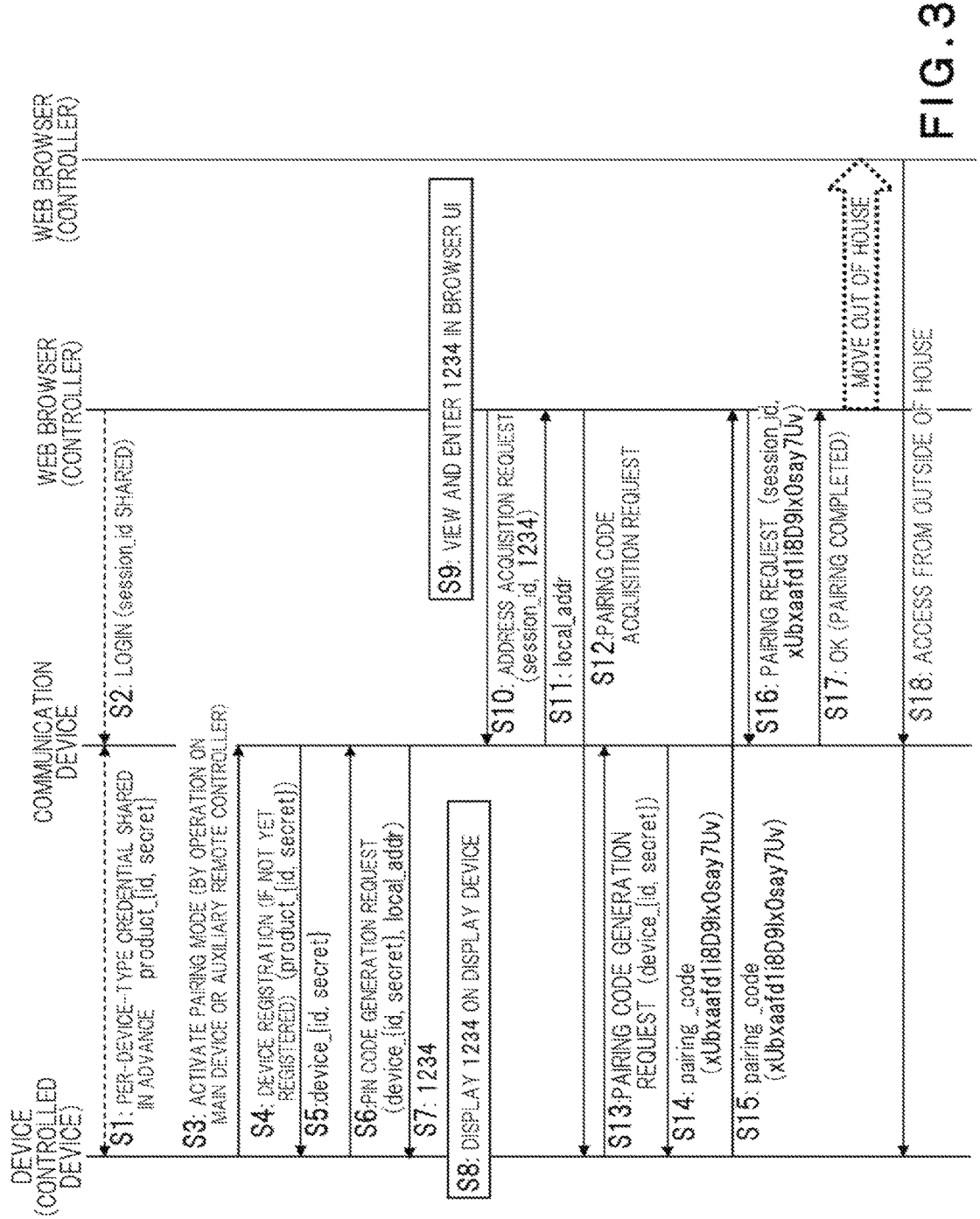
FIG. 3 is a diagram illustrating an exemplary sequence of communication among the communication device, a control device, and the device of FIG. 1.

FIG. 3 illustrates an exemplary sequence of the communications among the communication device 1, the control device 2, and the device 3 of FIG. 1.

The device 3 considered herein is an air conditioner and the control device 2 considered herein is a smartphone throughout the following explanations. The communication device 1 considered herein is a server that provides, as the Web service, the remote control service for the air conditioner. In the following explanations, the remote control service as such may also be called "communication device 1."

(Step S1) The first credential information is specified in the device 3. The first credential information includes the product ID (denoted as "product_id" in the figure) and a secret key (denoted as "product_secret" in the figure). Also, the device 3 is already connected to the home network (second network 5) by the WPS function of Wi-Fi or the like.

(Step S2) The user who owns the control device 2 is a member of (member who has created an account of) the remote control service of the communication device 1. The user logs on to the remote control service via the Web browser in the control device 2. When the user logs on, the session ID (denoted as "session_id" in the figure) is issued to the communication device 1 and this session ID is shared between the Web front-end (a Web page of the communication device 1 displayed on the Web browser) and the communication device 1. The session ID is one example of the identification information regarding the control device 2.

(Step S3) The user operates the remote controller of the device 3 and activates the operating mode for carrying out pairing with the user (which is hereinafter referred to as "pairing mode"). Methodology for this is defined on a per-product basis such as holding down a particular button of an auxiliary remote controller, pressing a "Connect to Network" button, and the like.

(Step S4) The device 3 transmits the device registration request to the communication device 1 when the pairing mode is activated for the first time. The device registration request includes the first credential information ("product_id" and "product_secret").

(Step S5) The communication device 1 generates the second credential information for the device 3 in accordance with the device registration request and transmits a response that includes the second credential information. The second credential information includes the device identification information (denoted as "device_id" in the figure) and the secret key (denoted as "device_secret" in the figure). Thereafter, in the communication from the device 3 to the communication device 1, authentication and access control are carried out based on the device identification information (device_id) and the secret key (device_secret).

(Step S6) The device 3 transmits the PIN code issue request (first code acquisition request) to the communication device 1. The PIN code issue request includes the device address (denoted as "local_addr" in the figure) as the argument. In addition, as described above, for authentication, the second credential information ("device_id" and "device_secret") is included.

Figure 5:
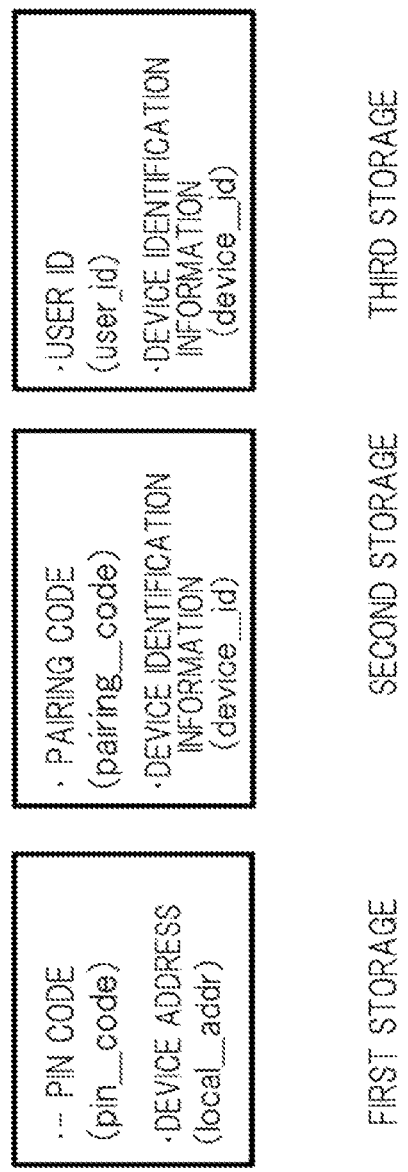
FIGS. 5A, 5B and 5C illustrate data examples stored in the first to third storages.

(Step S7) When the communication device 1 receives the PIN code issue request from the device 3, the communication device 1 carries out authentication of the device 3 on the basis of the device identification information (device_id) and the secret key (device_secret) and then the first generator 12 generates the PIN code (denoted as "pin_code" in the figure). The first generator 12 transmits a response that includes the generated PIN code to the device 3. The "pin_code" illustrated in the example of the figure is given as "1234". The first manager 13 associates the PIN code generated by the first generator 12 with the device address included in the PIN code issue request and stores the PIN code and the device address in the first storage 21. Specifically, the first manager 13 stores the device address (local_addr) with the PIN code (pin_code) used as the key. FIG. 5A illustrates data examples stored in the first storage 21. This entry is only valid, as one example, for a short time (e.g., 30 seconds). This may be realized by including timeout time information in the entry. Alternatively, when red is or memcached is used, the timeout time of the entry may be specified.

(Step S8) The device 3 displays the PIN code (pin_code) included in the response received from the communication device 1 on the display device with which the device 3 is equipped.

(Step S9) The user recognizes the PIN code by viewing the display device of the device 3. The user enters the PIN code (pin_code) displayed on the device 3 into the Web front-end displayed on the screen of the smartphone. One example of the PIN code entry screen is illustrated in the left portion of FIG. 4, where an entry field 71 for entering the PIN code and an OK button 72 are arranged. For example, the PIN code is entered in the entry field 71 in the screen of the left portion of FIG. 4 and then the OK button 72 is clicked.

(Step S10) The Web front-end displayed on the screen of the smartphone transmits an address acquisition request to the communication device 1. The address acquisition request includes the session ID (session_id) and the PIN code (pin_code) entered by the user.

(Step S11) The address provider 14 of the communication device 1 carries out authentication of the Web front-end of the control device 2 on the basis of the session ID (session_id) and then provides the search request that includes the PIN code as the key to the first manager 13. The first manager 13 searches the first storage 21 and acquires the device address (local_addr) that corresponds to the PIN code. The address provider 14 transmits a response that includes the device address (local_addr) acquired by the first manager 13 to the control device 2. The device address considered herein is, by way of example, https://192.168.11.10/pairing_code.

(Step S12) The Web front-end of the control device 2 accesses the device address (local_addr) of the device 3 and transmits the pairing code acquisition request (second code acquisition request).

(Step S13) When the device 3 accepts the access to the device address (local_addr) from the Web front-end, the device 3 generates the pairing code generation request and transmits the generated pairing code generation request to the communication device 1. The pairing code generation request includes the device identification information (device_id) and the secret key (device_secret).

(Step S14) The second generator 15 of the communication device 1 carries out authentication of the device on the basis of the device identification information (device_id) and the secret key (device_secret) included in the pairing code generation request and then generates the pairing code (denoted as "pairing_code" in the figure). The pairing code generated here is given as "xUbxaafd1i8D9lx0say7Uv". The second generator 15 transmits a response that includes the generated pairing code to the device 3. Also, the second manager 16 associates the pairing code (pairing_code) with the device identification information (device_id) and stores them in the second storage 22 as the pairing determination information. FIG. 5B illustrates data examples of the pairing determination information stored in the second storage 22. This entry is also defined to be only valid for a short time such as 30 seconds in the same manner as in the case of the PIN code. It should be noted that the device identification information may also be stored in the first storage 21 in addition to the PIN code and the device address and the pairing code may be generated only when the device identification information included in the pairing code generation request is registered in the first storage 21.

(Step S15) The device 3 transmits, as a response to the pairing code acquisition request, the pairing code (pairing_code) received from the communication device 1 to the control device 2.

(Step S16) The Web front-end of the control device 2 transmits a pairing request to the communication device 1. The pairing request includes the session ID (session_id) and the pairing code (pairing_code) as the arguments. The session ID is one example of the identification information regarding the control device 2.

(Step S17) The pairing unit 17 of the communication device 1 carries out authentication of the Web front-end on the basis of the session ID (session_id) included in the pairing request and then provides to the second manager 16 a search request that includes the pairing code (pairing_code) as the key. The second manager 16 searches the second storage 22 with the pairing code (pairing_code) used as the key, and acquires device identification information (device_id). The pairing unit 17 carries out paring between the user associated with the session ID (session_id) and the device 3 that has the device identification information (device_id). Specifically, the pairing unit 17 requests the third manager 18 to register the pairing information that associates the user ID with the device identification information (device_id). The third manager 18 registers the pairing information in the third storage 23 in accordance with the request. FIG. 5C illustrates data examples stored in the third storage 23. The pairing unit 17 transmits a pairing completion notification indicative of the completion of the pairing to the Web front-end. The Web front-end displays the message of the completion of the pairing on the screen. The pairing completion message is illustrated in the right portion of FIG. 4. The user is allowed to recognize the fact that the pairing has been completed by checking this message.

(Step S18) After that, as illustrated in the figure, the user moves out of his/her house. The user can operate the device 3 in his/her house from the Web front-end via the relay 19 of the communication device 1. Specifically, the user transmits to the communication device 1 a message for controlling the device 3 from the Web front-end. The message includes, as one example, a device address, the device identification information of the device 3 (device_id) or another any value for identifying the device 3. When the message includes the device identification information of the device 3 (device_id), the control device 2 of the user is previously informed of the device identification information securely by any means. The message may include a value for identifying the user such as a user ID or session ID. In the communication device 1, a relay destination of the message is internally specified as the device 3. The user may be specified based on a transmission source address of the message or a value for identifying the user. The relay 19 confirms with the user ID of the user about whether or not the device identification information of the device 3 (device_id) has been subjected to the pairing on the basis of the pairing information of the third storage 23. If it has been subjected to the pairing, relay of the message is permitted. In this case, the relay 19 transmits the message to the device 3. By virtue of this, it is made possible to carry out acquisition of the information of the device 3 and remote monitoring and control of the device 3.

In the above-described sequence, the user ID is associated with the device identification information as the pairing. Meanwhile, the IP address or MAC address of the control device 2 or the like may be associated with the device identification.

In accordance with the above procedure, it is made possible to carry out pairing between the user and the device 3 without the need of providing a dedicated application for the smartphone (solely relying on the Web browser) and without the need of incorporating an AP mode in the device 3. In addition, the operation made by the user in the course of the pairing only involves entry of the PIN code (e.g., four-digit value), so that the cost associated with user's operation is also low. The device 3 can achieve this scheme as long as it incorporates a display device that is at least capable of displaying the PIN code. If the device 3 includes a display device that displays time, this display device may be used on an as-is basis for the purpose of PIN code display.

Also, in this embodiment, a short PIN code is replaced by a local address having high anonymity (many home networks have the address of 192.168.10.0/24 or 192.168.11.0/24, or both of them), and a pairing code of a longer random character string is generated via the access to this local address. In addition, the formal pairing is performed using this pairing code. By virtue of this, resistance to the brute-force attack which is the problem discussed in the background art section can be increased. This embodiment can be implemented in a wide variety of applications as methodology for reducing the development cost of the device of the intercommunications with the user's terminal subjected to the pairing and the cost associated with setting by the user.

Figure 6:
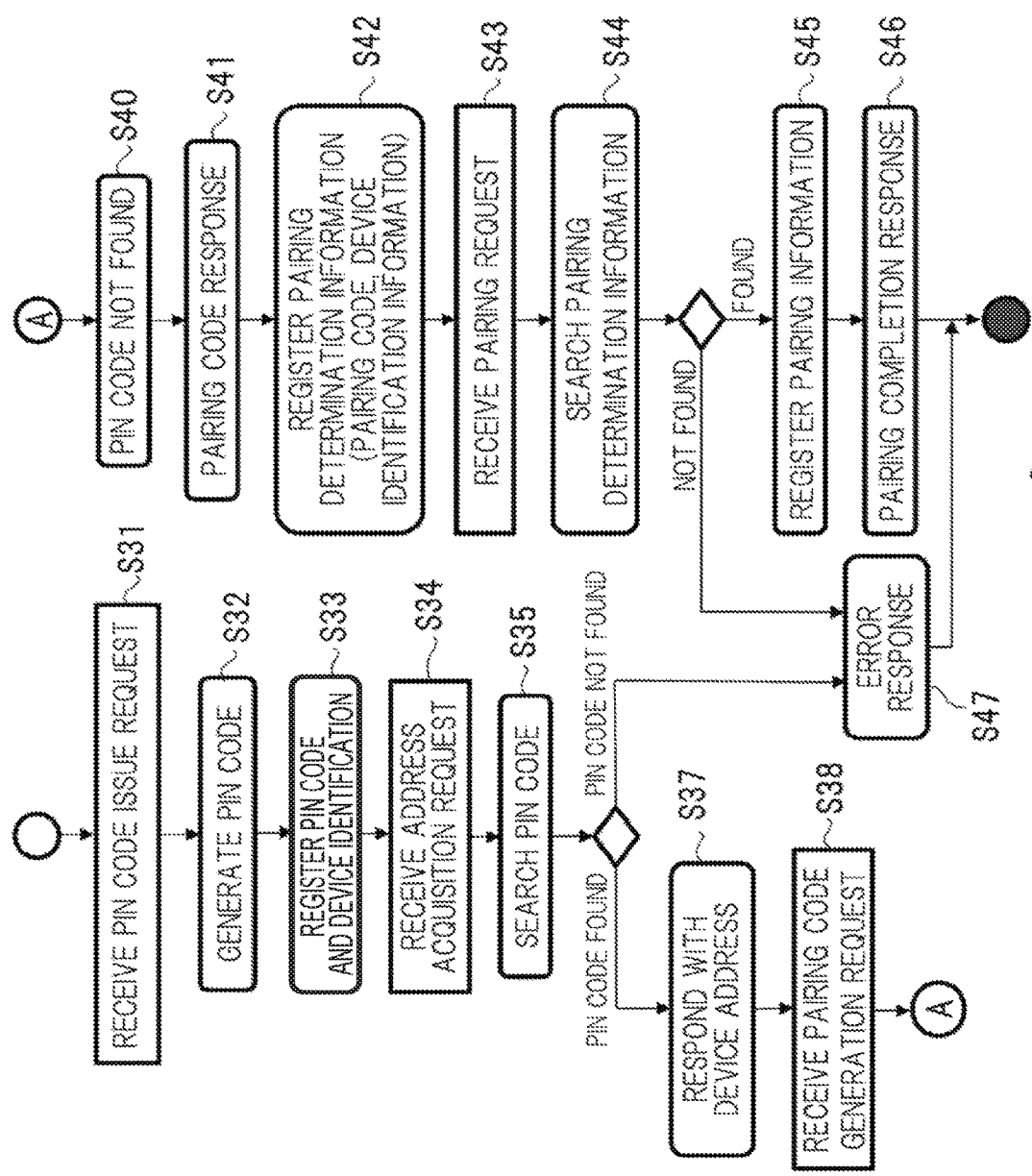
FIG. 6 is a flowchart of operation of the communication device.

FIG. 6 is a flowchart of the operation of the communication device 1.

When the communication device 1 receives from the device 3 the PIN code issue request that includes the device address (S31), the communication device 1 carries out authentication of the device 3 and then generates the PIN code by the first generator 12 and transmits the PIN code to the device 3 (S32). The first manager 13 associates the PIN code generated by the first generator 12 with the device address included in the PIN code issue request and registers them in the first storage 21 (S33). It should be noted that the device identification information may be stored in the first storage 21 in addition to the PIN code and the device address.

When the communication device 1 receives an address acquisition request that includes the PIN code from the control device 2 (S34), the address provider 14 searches the first storage 21 for the PIN code (S35). If the PIN code does not exist, then the address provider 14 transmits an error response to the control device 2 (S47). If the PIN code exists, the address provider 14 reads a device address that corresponds to the PIN code and transmits a response that includes the device address to the control device 2 (S37).

When the second generator 15 of the communication device 1 receives from the device 3 a pairing code generation request that includes the device identification information (S38), the second generator 15 carries out authentication of the device 3 and then generates the pairing code (S40), and transmits a response that includes the pairing code to the device 3 (S41). Also, the second generator 15 associates the generated pairing code with the device identification information to create the pairing determination information, and registers the pairing determination information in the second storage 22 via the second manager 16 (S42). It should be noted that, in addition to the PIN code and the device address, the device identification information may be stored in the first storage 21 and the pairing code may be generated only when the device identification information included in the pairing code generation request is registered in the first storage 21.

When the pairing unit 17 of the communication device 1 receives the pairing request that includes the session ID and the pairing code from the control device 2 (S43), the pairing unit 17 searches pairing determination information including the pairing code from the second storage 22 (S44). When such pairing determination information does not exist, the pairing unit 17 transmits the error response to the control device 2 (S47). When the pairing determination information exists, the pairing unit 17 associates the device identification information included in the pairing determination information with the user ID related to the session ID included in the pairing request and generates the pairing information. The pairing unit 17 registers the pairing information in the third storage 23 via the third manager 18 (S45). As a result of this, the pairing between the device 3 and the user is completed. The pairing unit 17 transmits the pairing completion response to the control device 2 (S46). Although the user ID is associated with the device identification information in the course of the pairing, an IP address or MAC address of the control device 2 may be associated with the device identification information.

(Hardware Configuration)

Figure 7:
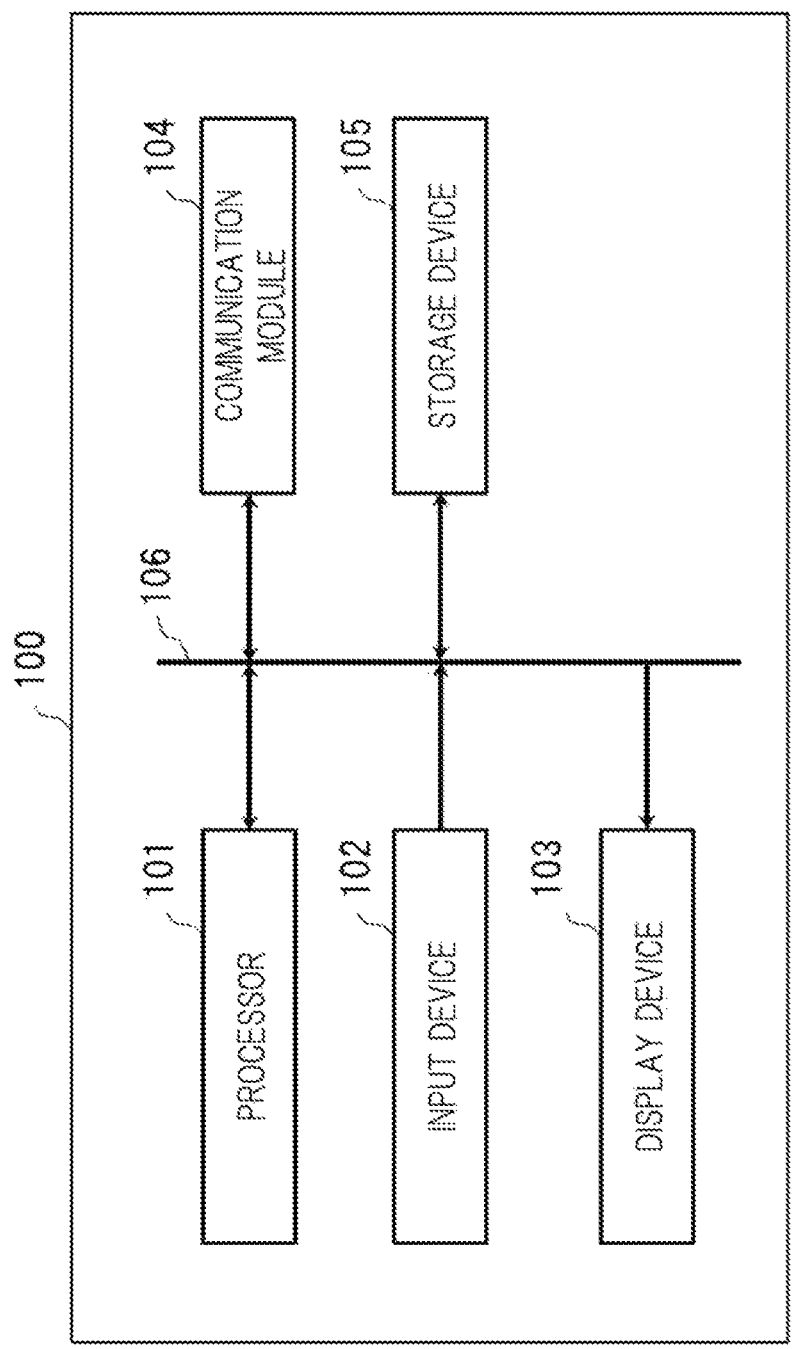
FIG. 7 is a diagram illustrating an example of a computer.

FIG. 7 is a diagram that illustrates one example of the computer 100. The computer 100 of FIG. 7 includes a processor 101, an input device 102, a display device 103, a communication module 104, and a storage device 105. The processor 101, the input device 102, the display device 103, the communication module 104, and the storage device 105 are interconnected via a bus 106. The communication device 1, the control device 2, or the device 3 can be configured, as one example, by this hardware configuration. Meanwhile, some of the components may not be provided. For example, the display device 103 or the input device 102 may not be provided. Also, a not-shown component or components may be additionally provided.

The processor 101 is processing circuitry or an electronic circuit, that includes a controller and arithmetic section of the computer 100. As the processor 101, for example, a general purpose processor, a central processing unit (CPU), a microprocessor, a digital signal processor (DSP), a controller, a microcontroller, a state machine, an application specific integrated circuit, a field programmable gate array (FPGA), a programmable logic device (PLD), and any combination thereof may be used.

The processor 101 carries out arithmetic processing on the basis of the data input from the individual devices connected thereto via the bus 106 (e.g., the input device 102, the communication module 104, and the storage device 105) and the program(s) and outputs the operation results and control signals to the individual devices connected thereto via the bus 106 (e.g., the display device 103, the communication module 104, and the storage device 105). Specifically, the processor 101 executes the operating system (OS) and the computer programs of the computer 100 and controls the individual devices that configure the computer 100.

The computer program is a program that causes the computer 100 to realize the above-described respective functional features of the communication device 1, the control device 2, or the device 3. The computer program is stored in a non-temporal and tangible computer-readable storage medium. The above-described storage medium is, by way of example and is not limited to, an optical disc, a magneto optical disc, a magnetic disc, a magnetic tape, flash memory, and semiconductor memory. When the processor 101 executes the computer program, the computer 100 behaves as the communication device 1, the control device 2, or the device 3.

The input device 102 is a device or circuit for inputting information in the computer 100. The input device 102 is, by way of example and is not limited to a keyboard, a mouse, a remote control receiver, and a touch panel.

The display device 103 is a device for displaying images and videos. The display device 103 is, by way of example and is not limited to, a liquid crystal display (LCD), a cathode-ray tube (CRT), and a plasma display panel (PDP). The display device 103 is capable of displaying any appropriate information stored, generated, or acquired by the communication device 1 or the device 3.

The communication module 104 is a circuit for the computer 100 to perform wired or wireless communications with an external device or devices.

The storage device 105 is a hardware storage medium that stores the operating system (OS) of the computer 100, data necessary for execution of the computer program(s), and data generated as a result of execution of the computer program(s). The storage device 105 includes a main storage device and an external storage device. The main storage device is, by way of example and is not limited to, RAM, DRAM, and SRAM. Also, the external storage device is, by way of example and is not limited to, a hard disc, an optical disc, flash memory, and a magnetic tape. The first storage 21 to the fourth storage 24 of the communication device 1 and the service storage 8 may be configured in the storage device 105 or may be configured in an external server connected via the communication module 104.

It should be noted that the computer 100 may include each one or more of the processor 101, the input device 102, the display device 103, the communication module 104, and the storage device 105.

Also, the communication device 1 or the device 3 may be configured by one single computer 100 or configured as a system constituted by the multiple interconnected computers 100. The multiple computers 100 may be interconnected via a network.

Further, the computer program may be stored in advance in the storage device 105 of the computer 100, stored in a storage medium that is external to the computer 100, or may be uploaded onto the Internet. In any case, the functions of the communication device 1 or the device 3 are realized by installing the computer program onto the computer 100 and executing the installed computer program.

(Second Embodiment)

According to the second embodiment, pairing is carried out with higher security than in the first embodiment. In the first embodiment, the pairing is established even when the pairing request (Step S16) that includes the session ID whose value is different from that of the session ID included in the address request (Step S10) of FIG. 3 is received by the communication device 1. In other words, even when these sessions ID are different from each other, the subsequent steps following the step S16 are all normally performed. Since the communication sequence extending from the step S10 to the step S16 is automatically executed in a short period of time, no substantial problem will be raised due to it. Meanwhile, it is also possible to implement a mode that deals with this problem. This embodiment is a mode that achieves this possible approach.

Figure 8:
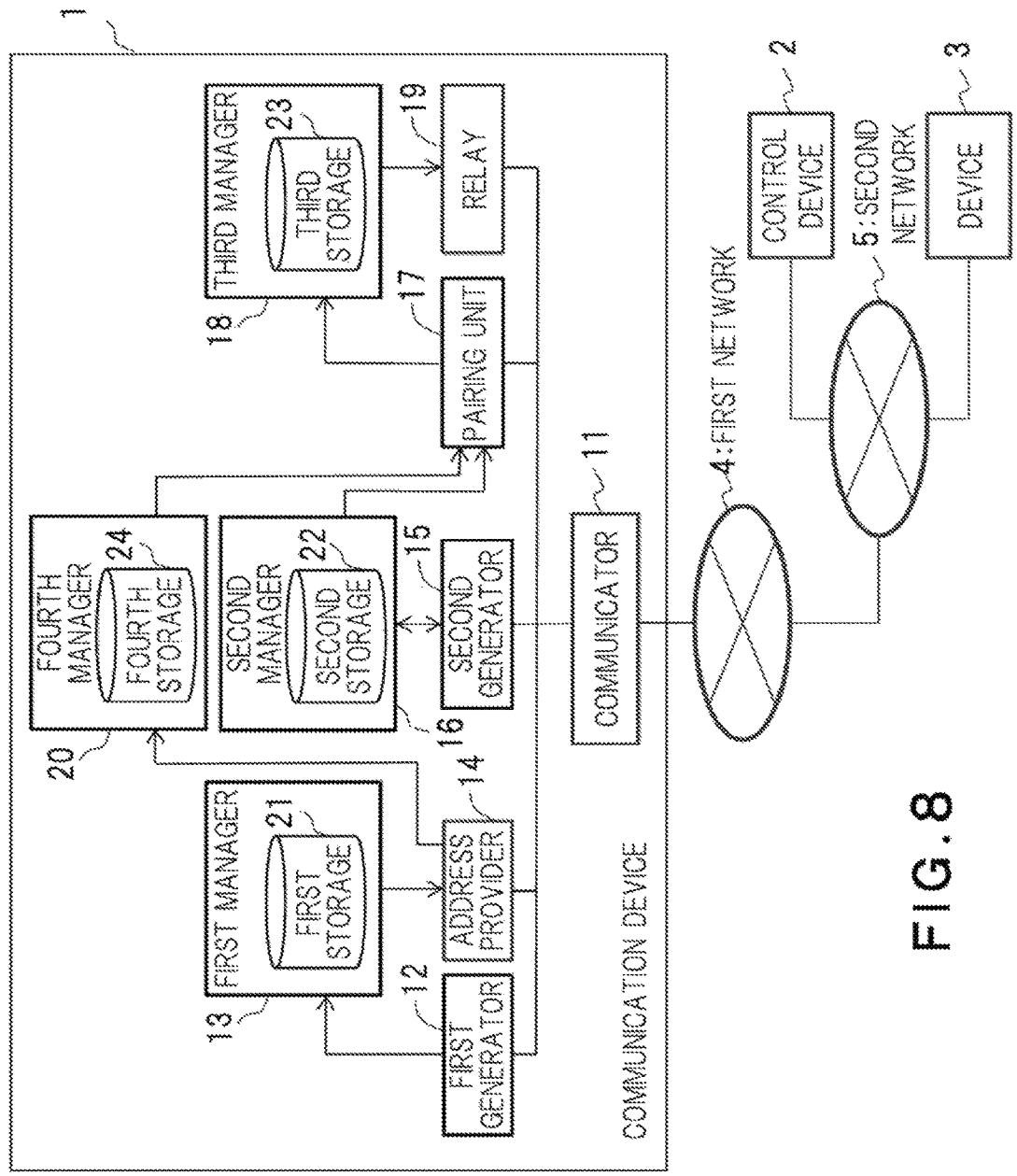
FIG. 8 is a diagram illustrating a communication system in accordance with a second embodiment.

FIG. 8 illustrates a communication system in accordance with the second embodiment. The difference from the FIG. 1 consists in the configuration of the communication device 1. The communication device 1 additionally includes a fourth manager 20 and a fourth storage 24. The fourth storage 24 may be the same device as those of the first to third storages or the service storage or may be a different device independent of these storages. The fourth storage 24 may be a storage for session authentication which the Web service basically includes.

The following describes the differences of the sequence of the communication system of this embodiment from that of the first embodiment.

Figure 9:
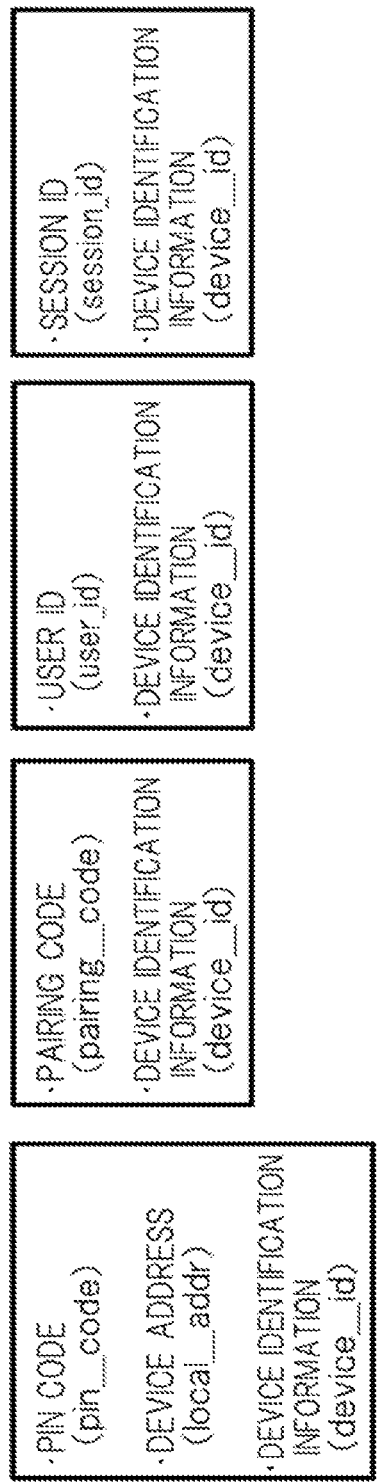
FIGS. 9A, 9B, 9C and 9D illustrate data examples stored in the first to fourth storages.

The communication device 1 stores, in accordance with the PIN code request of the step S6, the PIN code generated by the first generator 12 and the device identification information as well as the received device address in the first storage 21. The data examples stored in the first storage 21 is illustrated in FIG. 9A. It should be noted that the information stored in the second storage 22 and the third storage 23 is identical with that of the first embodiment. FIG. 9B and FIG. 9C illustrate the data examples stored in the second storage 22 and the third storage 23, respectively. FIG. 9B and FIG. 9C are identical with FIG. 5B and FIG. 5C.

The communication device 1 acquires, in accordance with the address acquisition request of the step S10, the device identification information (device_id) along with the device address (local_addr) from the first storage 21, and stores provisional pairing information. The provisional pairing information associates the device identification information (device_id) with the session ID (session_id) included in the address acquisition request. The data example of the provisional pairing information stored in the fourth storage 24 is illustrated in FIG. 9D.

The communication device 1 acquires from the second storage 22 the device identification information (device_id) that corresponds to the pairing code in accordance with the pairing request of the step S16. In addition, the communication device acquires from the fourth storage 24 the session ID (session_id) that corresponds to the device identification information (device_id), and determines whether or not it coincides with the session ID (session_id) included in the pairing request. When the former session ID coincides with the latter session ID, then the communication device 1 determines that the pairing is allowed. If the former does not coincide with the latter, then the communication device 1 determines that the pairing is not allowed.

Figure 10:
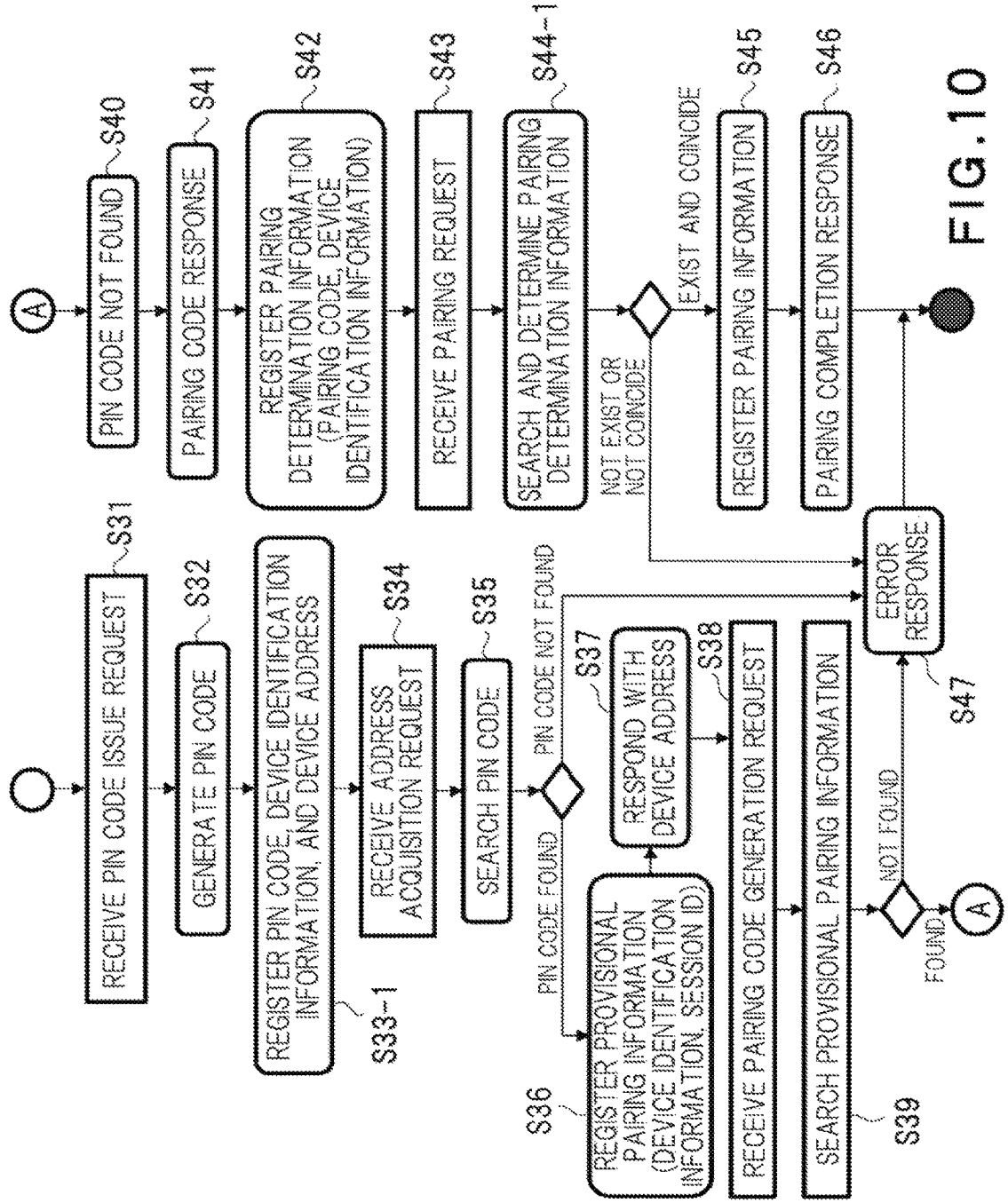
FIG. 10 is a flowchart of operation of the communication device in accordance with the second embodiment.

FIG. 10 is a flowchart of the operation of the communication device 1 in accordance with the second embodiment. It should be noted in this figure that the step S33 of FIG. 6 is replaced by the step S33-1, the steps S36 and S39 are additionally provided, and the step S44 is replaced by the step S44-1.

When the communication device 1 receives from the device 3 a PIN code issue request that includes the device address (S31), the communication device 1 carries out authentication of the device 3 and then generates the PIN code by the first generator 12, and transmits the PIN code to the device 3 (S32). The first manager 13 associates the PIN code generated by the first generator 12, the device address included in the PIN code issue request, and the device identification information of the device 3 with each other, and registers them in the first storage 21 (S33-1).

When the communication device 1 receives an address acquisition request that includes the PIN code and the session ID from the control device 2 (S34), the address provider 14 searches the PIN code from the first storage 21 (S35). If the PIN code does not exist, then the address provider 14 transmits an error response to the control device 2 (S47). If the PIN code exists, the address provider 14 generates provisional pairing information. The provisional pairing information includes the device identification information associated with the PIN code and the session ID included in the address acquisition request. The address provider 14 registers the provisional pairing information in the fourth storage 24 via the second manager 16 (S36). Also, the address provider 14 transmits a response that includes the device address to the control device 2 (S37).

When the second generator 15 of the communication device 1 receives from the device 3 a pairing code generation request that includes the device identification information (S38), the second generator 15 searches the fourth storage 24 for the provisional pairing information that includes the device identification information (S39). If such provisional pairing information does not exist, the second generator 15 transmits an error response to the device 3 (S47). If the provisional pairing information exists, the second generator 15 generates the pairing code (S40), and transmits a response that includes the pairing code to the device 3 (S41). Also, the second generator 15 associates the generated pairing code with the device identification information to generate the pairing determination information, and registers the pairing determination information via the second manager 16 in the second storage 22 (S42).

When the pairing unit 17 of the communication device 1 receives a pairing request that includes the session ID and the pairing code from the control device 2 (S43), the pairing unit 17 searches pairing determination information including the pairing code from the second storage 22 (S44-1). When such pairing determination information does not exist, the pairing unit 17 transmits an error response to the control device 2 (S47). When the pairing determination information exists, the device identification information included in the pairing determination information is identified. In addition, a session ID that corresponds to the identified device identification information is identified in the fourth storage 24. It is determined whether or not the identified session ID coincides with the session ID included in the pairing request (S44-1). If the session IDs are not coincident with each other, the pairing unit 17 transmits an error response to the control device 2 (S47). If the session IDs are coincident with each other, then pairing information that associates the device identification information with the user ID corresponding to the session ID is generated and the pairing information is registered via the third manager 18 in the third storage 23 (S45). As a result of this, the pairing between the device 3 and the user is completed. The pairing unit 17 transmits the pairing completion response to the control device 2 (S46).

In accordance with the above procedure, when the session ID included in the address request is different from the session ID included in the pairing request, the pairing is not carried out. By virtue of this, it is made possible to increase the security relative to the first embodiment to carry out the pairing.

(Third Embodiment)

In this embodiment, a variant method is illustrated according to which an access is made from the Web front-end of the control device 2 to the device 3.

The access (pairing code acquisition request) of the step S12 of FIG. 3 is a cross-origin access from the Web front-end. In other words, the origin of the Web service provided by the communication device 1 is different from the origin of the service (the service that accepts the pairing code acquisition request) provided by the device 3. In order that such a cross-origin access is permitted, an HTTP server (providing the function of "https://192.168.11.10/pairing_code") incorporated in the device 3 needs to be an https server having the legitimate TLS server certificate. The legitimate certificate as used herein by definition refers to the certificate having a certificate chain leading to the root certificate authority approved by the Web browser. When the legitimate TLS server certificate can be issued to the HTTP server in the local network, the sequence of FIG. 3 can be implemented on an as-is basis. However, when the legitimate TLS server certificate cannot be issued to the device 3, it is necessary to adopt another method that is different than the cross-origin access, which will be illustrated below.

Cross-origin access is not made in the step S12 of FIG. 3 but the response of the step S11 is defined as the redirection (HTTP302 or HTTP303) response to the device address (local_addr). At this point, the URL of the communication device 1 that redirects back to the device address (local_addr) is set as the argument. For example, if the URL of the communication device 1 (air conditioner remote control service) is "https://aircon-remote-control.com," then the redirection destination information in the redirect response (Location header value) is set as "http://192.168.11.10/pairing_code?redirect_uri=https://aircon-remote-control.com".

In the step S14, the device 3 that acquired the pairing code (pairing_code) appends the pairing code (pairing_code) to the "redirect_uri" argument acquired in the step S12 and makes a redirect response to the control device 2. Specifically, in the above-described example, the device 3 sets "https://aircon-remote-control.com?pairing_code=xUbxaafd1i8D9lx0say7Uv" in the Location header and makes a response to the control device 2.

In accordance with the above procedure, it is made possible to carry out the respective steps (S12 to S15) associated with the pairing code acquisition in a redirection-based manner without performing cross-origin access point by the Web front-end. Since the device 3 is arranged in the local network, the HTTP server may be used in place of the HTTPS server. It should be noted that any methods may be used as appropriate as the method of implementing the redirection other than the above-described method that makes the HTTP302 or HTTP303 response. For example, a method that uses a meta tag of the Web front-end (html) may be used. Several methods are generally known, any one of which may be relied upon.

(Fourth Embodiment)

In the fourth embodiment, the control device 2 transmits the paring code generation request and the device 3 transmits the paring request and thereby, the paring can be realized.

The block diagrams of the present embodiment are same as FIGS. 1 and 2 employed in the first embodiment. Below, the communication device 1 and the device 3 in the present embodiment are described with respect to a difference of functions from the communication device 1 and the device 3 in the first embodiment. First, the communication 1 is described.

The second generator 15 of the communication device 1 can receive a pairing code generation request from the control device 2. The pairing code generation request includes device identification information of the control device 2. When the second generator 15 receives the pairing code generation request, the second generator 15 generates the pairing code.

The second manager 16 associates the generated pairing code with the device identification information of the control device 2 and registers the pairing code and the device identification information in the second storage 22 as the pairing determination information (i.e., make the second storage hold the paring code and the device identification information).

When the second manager 16 receives a search request including the pairing code as the key from the pairing unit 17, the second manager 16 searches the paring determination information that corresponds to the search request from the second storage 22. The second manager takes out the identification information regarding the control device 2 from the paring determination information and returns the identification information to the pairing unit 17.

The pairing unit 17 receives a pairing request from the device 3 via the communicator 11. The pairing request includes the pairing code and the identification information regarding the device 3. When the pairing unit 17 receives the pairing request, the pairing unit 17 provides a search request including the pairing code as the key to the second manager 16 and acquires, from the second manager 16, the identification information regarding the control device 2 that corresponds to the search request.

The third manager 18 associates the identification information regarding the control device 2 acquired by the pairing unit 17 with the device identification information and register the identification information and the device identification information in the third storage 23 (i.e., make the third storage 23 hold the identification information and the device identification information).

The device 3 in the present embodiment is described with respect to a difference of function from the device in the first embodiment.

The second acquirer 54 of the device 3 provides a service associated with accepting the pairing code registration request (second code registration request) via the device address. When the second acquirer 54 receives, by the service, the pairing code registration request including the paring code from the control device 2, the second acquirer 54 generates a pairing request and transmits the pairing request to the communication device 1. The pairing request includes the device identification information of the device 3.

Figure 11:
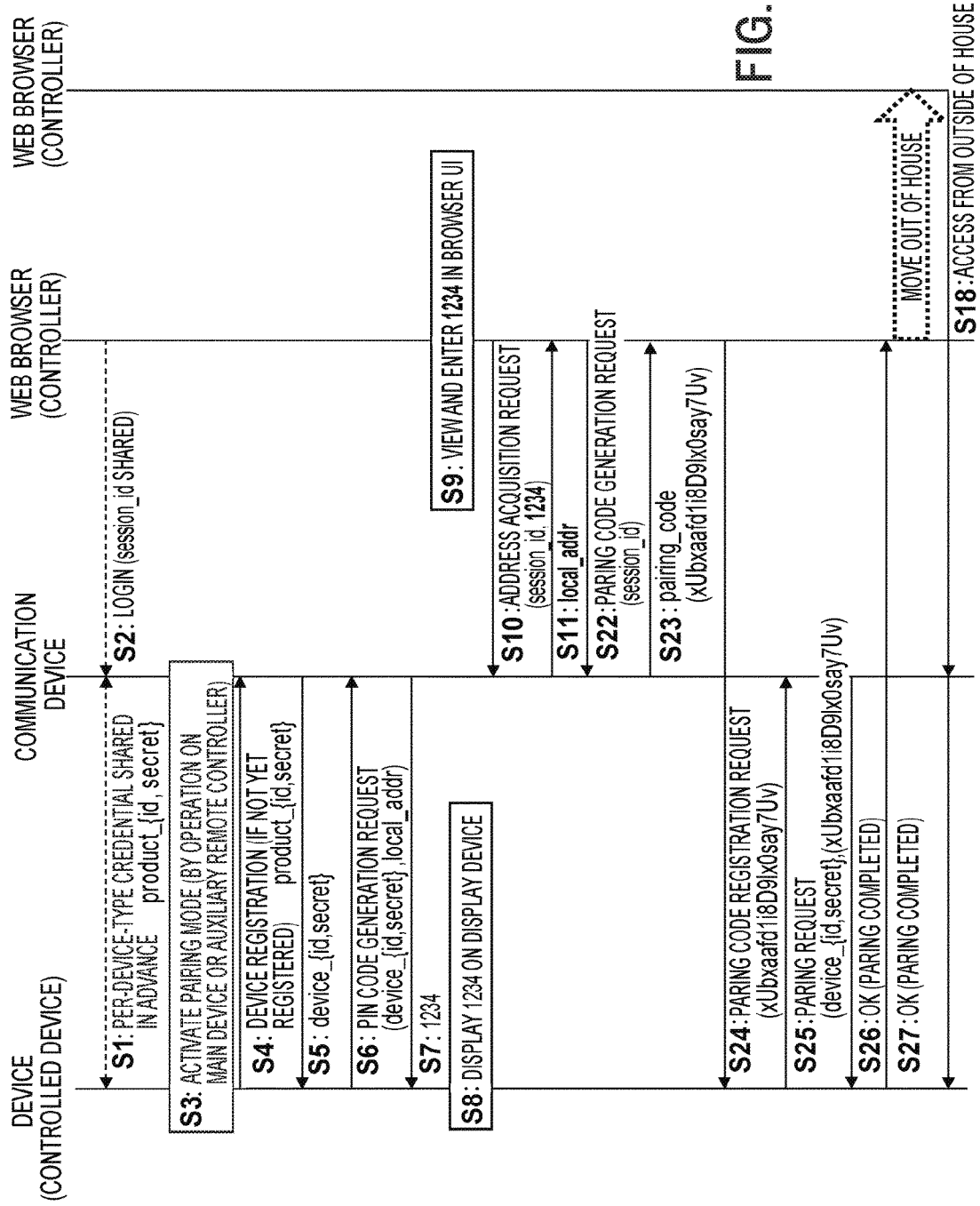
FIG. 11 is a communication sequence diagram in accordance with a fourth embodiment.

FIG. 11 illustrates an exemplary sequence of the communications among the communication device 1, the control device 2, and the device 3. Below, a difference from the sequence in the first embodiment is described. The steps S1 to S11 and S18 are same as those in the first embodiment. The steps S12 to S17 are replaced with steps S22 to S27. Below, steps on and after the step 19 are described. (Step S10) The Web front-end displayed on the screen of the smartphone transmits an address acquisition request to the communication device 1. The address acquisition request includes the session ID (session_id) and the PIN code (pin_code) entered by the user.

(Step S11) The address provider 14 of the communication device 1 carries out authentication of the Web front-end of the control device 2 on the basis of the session ID (session_id) and then provides the search request that includes the PIN code as the key to the first manager 13. The first manager 13 searches the first storage 21 and acquires the device address (local_addr) that corresponds to the PIN code. The address provider 14 transmits a response that includes the device address (local_addr) acquired by the first manager 13 to the control device 2. The device address considered herein is, by way of example, https://192.168.11.10/activate.

(Step S22) The Web front-end of the control device 2 transmits the pairing code generation request (second code generation request) to the communication device 1. The paring code generation request includes the identification information (session_id) regarding the control device 2.

Figure 12:
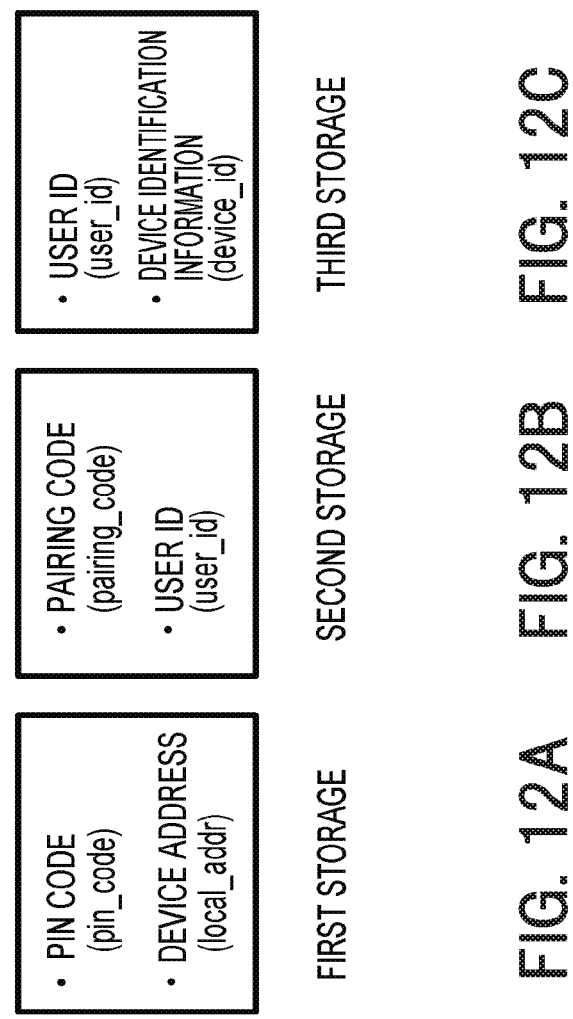
FIGS. 12A, 12B and 12C illustrate data examples stored in the first to third storages.

(Step S23) The second generator 15 of the communication device 1 carries out authentication of the Web front end on the basis of the session ID (session_id) included in the pairing code generation request and then generates the pairing code (denoted as "pairing_code" in the figure). The pairing code generated here is given as "xUbxaafd1i8D9lx0say7Uv". The second generator 15 transmits a response that includes the generated pairing code to the control device 2. Also, the second manager 16 associates the pairing code (pairing_code) with the user ID (user_id) and stores them in the second storage 22 as the pairing determination information. FIG. 12B illustrates data examples of the pairing determination information stored in the second storage 22. This entry is also defined to be only valid for a short time such as 30 seconds in the same manner as in the case of the first embodiment. The address acquisition request (S10) and the paring code generation request (S22) are collectively transmitted and responses (S21 and S23) to the requests may be received collectively. FIG. 12A indicates an example of data in the first storage, which is the same as that in the first embodiment.

(Step S24) The Web front-end of the control device 2 accesses the device address (local_addr) of the device 3 and transmits the pairing code registration request (second code registration request) including the paring code.

(Step S25) When the device 3 accepts the pairing code registration request transmitted to the device address (local_addr) from the Web front end, the device 3 transmits the paring request including the paring code to the communication device 1. The pairing request includes the device identification information (device_id) and the secret key (device_secret) as well as the paring code.

(Step S26) The pairing unit 17 of the communication device 1 carries out authentication of the device 3 on the basis of the device identification information (device_id) and the secret key (device_secret) included in the paring request and then provides to the second manager 16 a search request that includes the pairing code (pairing_code) as the key. The second manager 16 searches the second storage 22 with the pairing code (pairing_code) used as the key, and acquires identification information (user_id) regarding the control device. The pairing unit 17 carries out paring between the device 3 corresponding to the device identification information (device_id) and the user. Specifically, the pairing unit 17 requests the third manager 18 to register the pairing information that associates the user ID (user_id) with the device identification information (device_id). The third manager 18 registers the pairing information in the third storage 23 in accordance with the request. FIG. 12C illustrates data examples stored in the third storage 23. The pairing unit 17 transmits a pairing completion notification indicative of the completion of the pairing to the device 3. Thereby, the device 3 is allowed to recognize the fact that the pairing has been completed.

(Step S27) When the device 3 receives the paring completion notification, the device 3 also transmits the paring completion notification to the Web front end. The Web front end displays the message of the completion of the pairing on the screen. The user is allowed to recognize the fact that the pairing has been completed by checking this message.

In the above-described sequence, the user ID is associated with the device identification information as the pairing. Meanwhile, the IP address or MAC address of the control device 2 or the like may be associated.

In accordance with the above procedure, it is made possible to carry out pairing even in the embodiment where the control device 2 transmits the paring code generation request and the device 3 transmits the paring request. By collecting the steps S10, S11, S22 and S23, the paring can be carried out by the number of steps less than those in the first embodiment or the second embodiment.

Figure 13:
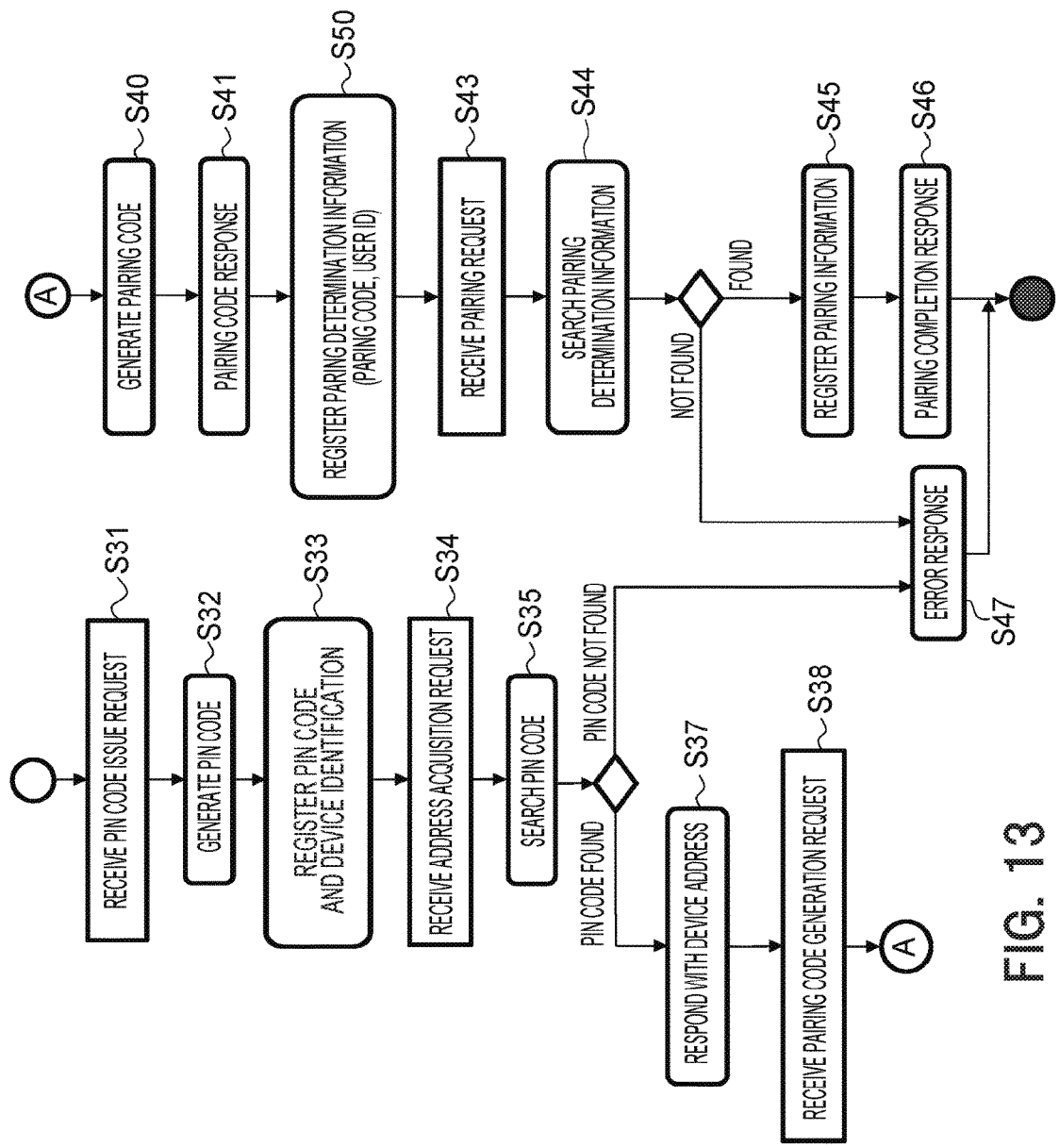
FIG. 13 is a flowchart of operation of the communication device in accordance with the fourth embodiment.

FIG. 13 illustrates a flow chart of an operation by the communication device 1 according to the fourth embodiment. The step S42 in FIG. 6 is replaced with the step S50. The other steps are the same as those in FIG. 6. In the step S42 of FIG. 6, a pair of the paring code and the device identification information is registered as the paring determination information although in the step S50, a pair of the paring code and the control device identification information (here, user ID) is registered as the paring information. The communication device, the device (controlled device) or the control device in each embodiment may also be realized using a general-purpose computer device as basic hardware. That is, each function provided in the communication device, the device (controlled device) or the control device can be realized by causing a processor mounted in the above described computer device to execute a program. In this case, the communication device, the device (controlled device) or the control device may be realized by installing the above described program in the computer device beforehand or may be realized by storing the program in a storage medium such as a CD-ROM or distributing the above described program over a network and installing this program in the computer device as appropriate. Furthermore, the storages provided in the communication device, the device (controlled device) or the control device may also be realized using a memory device or hard disk incorporated in or externally added to the above described computer device or a storage medium such as CD-R, CD-RW, DVD-RAM, DVD-R as appropriate.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

The term "storage" may encompass any device which can permanently memorize data by magnetic technology, optical technology or non-volatile memory. For example, the storage may be an HDD, an optical disc, an SDD or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication device connected with a device and a control device via a communication network, respectively, comprising:
    a receiver configured to receive a first code generation request from the device, the first code generation request including address information of a service provided by the device;
    processing circuitry configured to generate a first code in response to the first code generation request being received; and
    a transmitter configured to transmit the first code to the device, the device being configured to display the first code to a user, wherein
    the processing circuitry holds the first code in association with the address information,
    the receiver receives an address acquisition request of the address information required for accessing the service provided by the device from the control device, the address acquisition request including the first code input into the control device by the user,
    the processing circuitry checks whether the first code included in the address acquisition request is held in association with the address information,
    the transmitter transmits the address information to the control device on condition if the first code included in the address acquisition request is held in association with the address information,
    the receiver receives a second code generation request from the control device,
    the processing circuitry generates a second code in response to the second code generation request being received,
    the transmitter transmits the second code to the control device,
    the processing circuitry holds the second code in association with first identification information of the control device,
    the receiver receives a pairing request including the second code from the device which has received the second code from the control device, and
    the processing circuitry generates pairing information on condition that the second code is held in association with the first identification information of the control device, the pairing information associating the identification information of the device with the first identification information of the control device.

2. The communication device according to claim 1, wherein the processing circuitry is configured to relay a communication between the control device and the device based on the paring information after the paring information is generated.

3. The communication device according to claim 2, wherein
    the receiver receives a message received from the control device,
    the processing circuitry is configured to relay the message to the device on condition that identification information of a device to which the message is addressed is associated with the first identification information by the pairing information, and
    the processing circuitry does not carry out relay of the message on condition that identification information of a device to which the message is addressed is not associated with the first identification information by the paring information.

4. The communication device according to claim 1, wherein
    the address acquisition request includes second identification information of the control device,
    the pairing request includes third identification information of the control device, and
    the processing circuitry does not generate the pairing information, regardless of the second code being held in association with the first identification information of the control device, if the third identification information included in the pairing request is not coincident with the second identification information included in the acquisition request.

5. The communication device according to claim 4, wherein each of the second identification information and the third identification information is a session ID assigned to the user.

6. The communication device according to claim 1, wherein the first identification information is a user ID of the user.

7. A communication method comprising:
    receiving a first code generation request from a device, the first code generation request including address information of a service provided by the device;
    generating the first code in response to the first code generation request being received;
    transmitting the first code to the device, the device being configured to display the first code to a user;
    holding the first code in association with the address information;
    receiving an address acquisition request of the address information required for accessing the service provided by the device from a control device, the address acquisition request including the first code input into the control device by the user;
    checking whether the first code included in the address acquisition request is held in association with the address information;
    transmitting the address information to the control device if the first code included in the address acquisition request is held in association with the address information;

receiving a second code generation request from the control device;

generating a second code in response to the second code generation request being received;

transmitting the second code to the control device;

holding the second code in association with first identification information of the control device;

receiving a pairing request including the second code from the device which has received the second code from the control device; and generating pairing information on condition that the second code is held in association with the first identification information of the control device, wherein the pairing information associates the identification information of the device with the first identification information of the control device.

8. A non-transitory computer readable medium having a computer program stored therein which, when executed by a computer, causes the computer to perform processing comprising:

receiving a first code generation request from a device, the first code generation request including address information of a service provided by the device;

generating the first code in response to the first code generation request being received;

transmitting the first code to the device, the device being configured to display the first code to a user;

holding the first code in association with the address information;

receiving an address acquisition request of the address information required for accessing the service provided by the device from a control device, the address acquisition request including the first code input into the control device by the user;

checking whether the first code included in the address acquisition request is held in association with the address information;

transmitting the address information to the control device if the first code included in the address acquisition request is held in association with the address information;

receiving a second code generation request from the control device;

generating a second code in response to the second code generation request being received;

transmitting the second code to the control device;

holding the second code in association with first identification information of the control device;

receiving a pairing request including the second code from the device which has received the second code from the control device; and generating pairing information on condition that the second code is held in association with the first identification information of the control device, wherein the pairing information associates the identification information of the device with the first identification information of the control device.

9. A device connected with a communication device and a control device via a communication network, respectively, comprising:

a transmitter configured to transmit a first code generation request to a communication device, the first code generation request including address information of a service provided by the device;

a receiver configure to receive a first code generated by the communication device from the communication device; and a display device configured to display the first code to a user, wherein the receiver receives a second code registration request including a second code from the control device via the service provided by the device, the control device has acquired the address information of the service from the communication device, the communication device has received the first code from the control device based on the user's inputting the first code into the control device, and the second code has been generated and transmitted from the communication device to the control device upon reception of a second code generation request from the control device, and the transmitter transmits a paring request for pairing the device and the control device, which includes the second code, to the communication device.

* * * * *